Dec. 9, 1958 R. H. TOUBHANS 2,863,221
MICROMETER COMPARATOR
Filed May 31, 1957 2 Sheets-Sheet 1
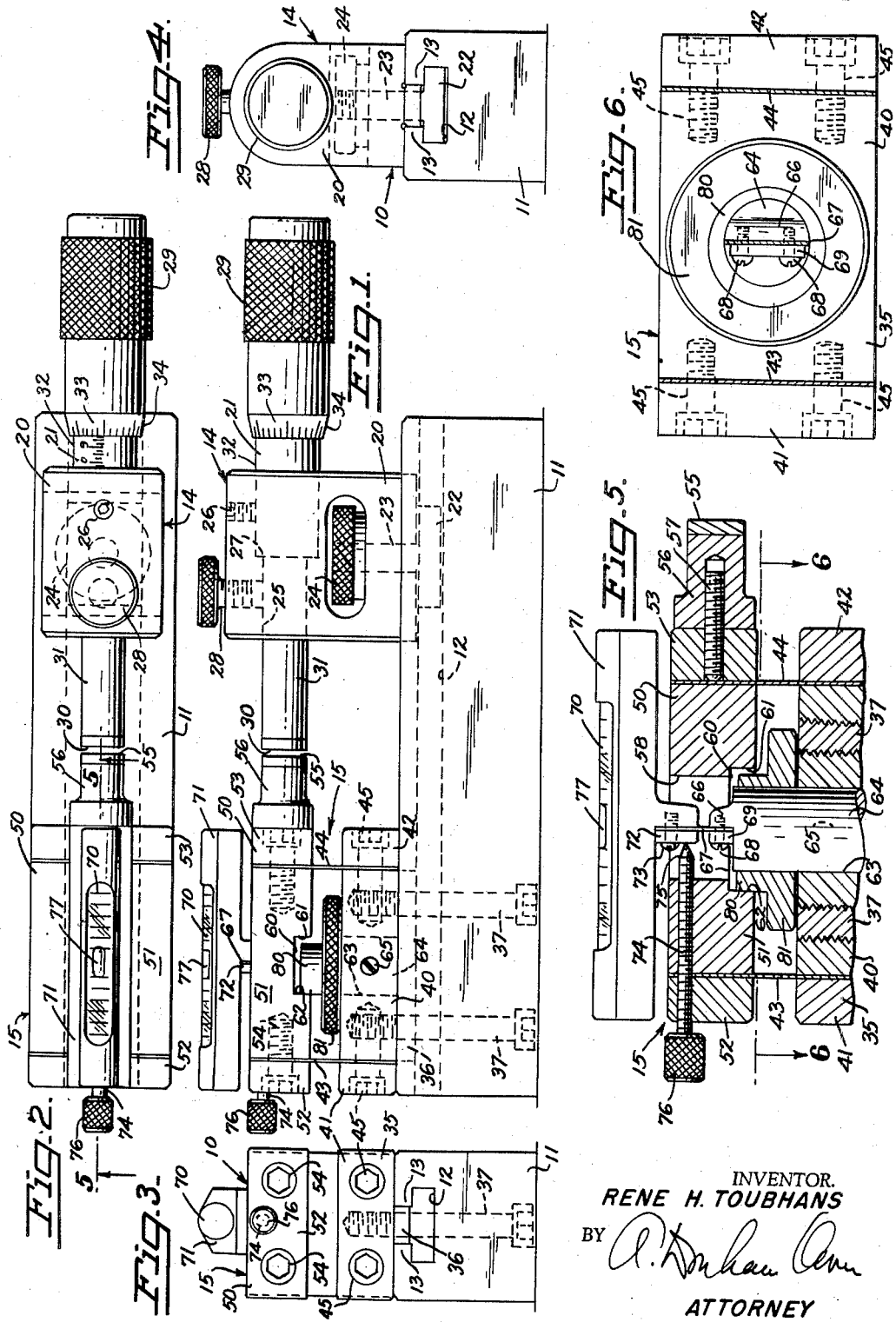
INVENTOR.
RENE H. TOUBHANS
BY
ATTORNEY Dec. 9, 1958 R. H. TOUBHANS 2,863,221
MICROMETER COMPARATOR
Filed May 31, 1957 2 Sheets-Sheet 2
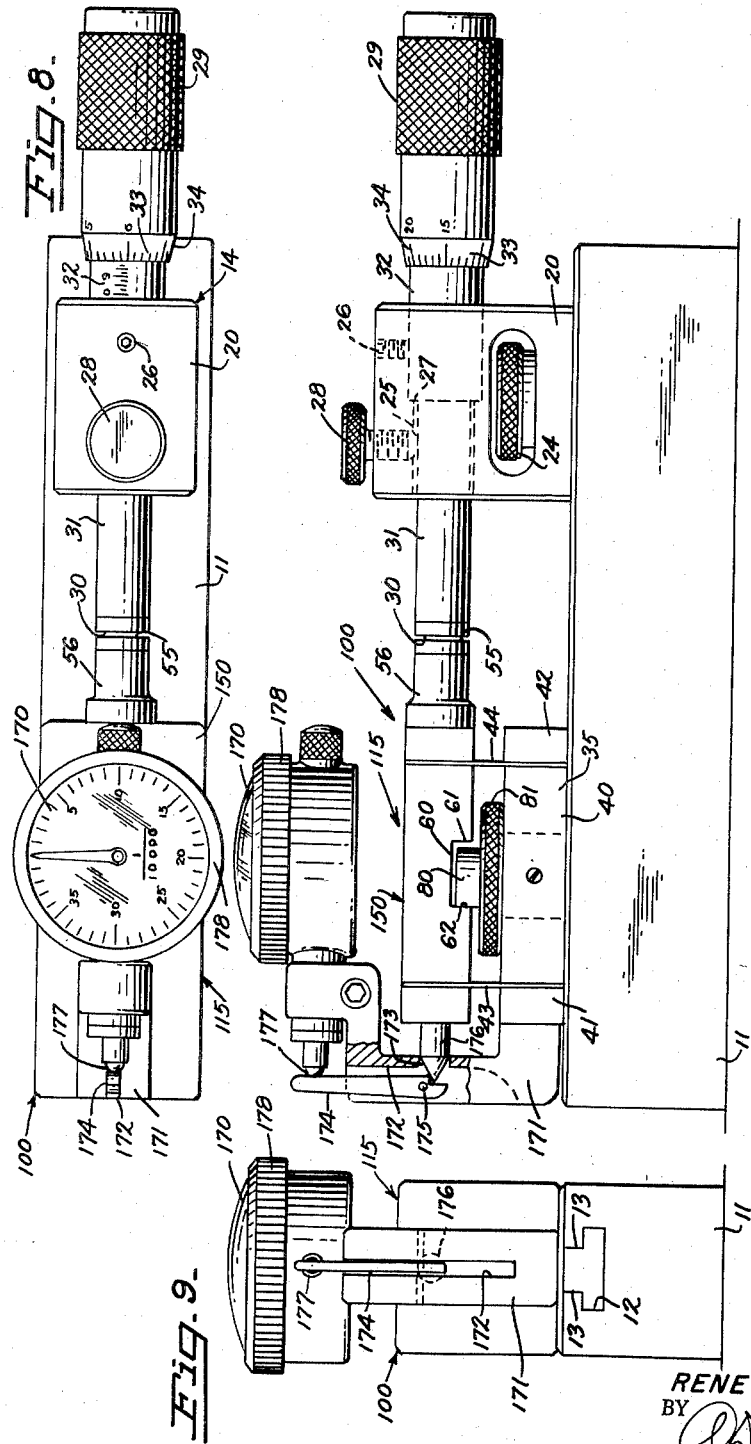
INVENTOR.
RENE H. TOUBHANS
BY
ATTORNEY 2,863,221

MICROMETER COMPARATOR

Rene H. Toubhans, San Leandro, Calif.

Application May 31, 1957, Serial No. 662,663

6 Claims. (Cl. 33—147)

This invention relates to an improved micrometer-comparator for reading variances from a desired dimension.

The present invention provides a superior direct-reading comparator by which the amount of variance of machine parts from a predetermined dimension can be quickly and accurately determined. The device is easily made to read in ten-thousandths or hundred-thousandths of an inch, and can be made to read in millionths of an inch.

One object of the invention is to provide a novel type of micrometer-comparator that gives very rapid and accurate readings.

Another object of the invention is to provide a micrometer-comparator of relatively inexpensive construction without sacrificing accuracy of operation.

Another object of the invention is to provide a novel type of micrometer-comparator mounted on spring bearings and responsive to minute deflections for measuring the variance of precision parts.

Broadly speaking, my new device includes a base supporting a headstock and a tailstock, between the anvils of which a machine part may be placed for comparing its size with an accurate gauge block. The tailstock may be a conventional micrometer, though it need not necessarily be calibrated. However, the headstock incorporates important new features; it includes a body member supported above a base on a parallel pair of leaf spring bearings for movement generally parallel to the base. Fore-and-aft movement of the headstock anvil causes flexure of the springs and actuates an accurate indicator to show amount of movement. The device also includes a member, such as a cam, for retracting the headstock anvil from and restoring it to a set position, so that a machine part can be inserted between it and the tailstock and rapidly measured.

Other objects and advantages of the invention will appear from the following description of two preferred embodiments thereof.

In the drawings:

Fig. 1 is a view in side elevation of a micrometer-comparator embodying the principles of the present invention.

Fig. 2 is a top plan view of the same.

Fig. 3 is an end elevationl view from the left-hand end of the same.

Fig. 4 is an end elevational view from the right-hand end of the same.

Fig. 5 is an enlarged view in side elevation and partly in section of a portion thereof including the headstock, taken along the line 5—5 in Fig. 2.

Fig. 6 is a view in horizontal section taken along the line 6—6 in Fig. 5.

Fig. 7 is a view in side elevation and partly in section of a modified form of micrometer-comparator also embodying the principles of the present invention.

Fig. 8 is a top plan view of the same, and

Fig. 9 is an end elevational view of the same from the left-hand end.

The micrometer-comparator 10 shown in Figs. 1 through 6 includes a support frame 11 grooved to provide ways 12, preferably as a longitudinally extending open-end slot with parallel guides 13. Mounted in the ways 12 are a tailstock 14 and a headstock 15.

The tailstock 14 may be a standard micrometer, of a type well known in the art. It may comprise a body 20 and a spindle 31 mounted retractably therein. The body 20 may be mounted slidably in the ways 12 by means of a tongue 22, which may have a screw 23 with a knurled head 24 for locking the body 20 to the frame 11 in any desired location. A micrometer barrel 21 may be mounted slidably in the body 20 and may be held frictionally in a close-tolerance bore 25 through the body 20, preferably with the aid of a set screw 26. Its forward position may be limited by a step 27, and a set screw 28 may lock the rotatable spindle 31 in any desired position. The thimble 29 may be knurled as shown, and the inner end of the spindle 31 may comprise an anvil 30, which may be provided with a carbide face ground to very accurate tolerances to provide an optical flat.

Although for pure comparison uses calibration of the tailstock 14 is not necessary, a micrometer-calibrated thimble and barrel are shown by way of example, the spindle 31 being reciprocatable relative to the barrel 21 by turning the thimble 29, the amount of longitudinal movement of the anvil 30 being indicated by the calibrations 32 on the barrel 21 and the calibrations 33 on the beveled end 34 of the thimble 29. This gives the thickness of a gauge block inserted between the anvil 30 and the headstock anvil 55, since the micrometer can be set to have a zero reading when its anvil 30 is in contact with the headstock anvil 55. In fact, an accurate reading of the width (or the like) of the part up to a thousandth of an inch is usually obtained by the readings on the tailstock micrometer. If desired, however, different types of spindles may be used with either form of headstock shown herein.

The headstock 15 comprises a base assembly 35 with a tongue 36 which may be held between the guides 13 and preferably is secured fixedly to the frame 11 by a pair of machine screws 37, as shown in the drawings. The base assembly 35 comprises a central portion 40 and two end members 41 and 42, which anchor to the central portion 40 the lower ends of a pair of parallel flat spring bearings 43 and 44 preferably made out of flat leaf-spring material. By way of example, the springs 43, 44 may be about six-thousandths of an inch thick, but they may be heavier or lighter, depending upon the conditions to be used. In each instance, the spring member 43, 44 is clamped between the central portion 40 of the headstock base 35 and the respective end portions 41, 42, as by machine screws 45.

The headstock 15 also includes an upper assembly 50 supported on the upper end of the spring bearings 43, 44 with adequate clearance from the base assembly 35 to give the springs 43, 44 opportunity for movement and flexure. This upper assembly 50 includes a central body portion 51 and end members 52, 53, with suitable screws 54 clamping the springs 43, 44 between them and the body 51. At the inner end 53 and rigidly secured to it or formed as an integral part thereof is an anvil 55, preferably provided with a carbide face similar to the anvil 30 on the tailstock 14. As shown in the drawings, the anvil 55 may be part of a member 56 which is secured by a stud 57 to the member 53. The anvils 30 and 55 are carefully made so that the two faces will be perfectly parallel to each other.

The body 51 is preferably provided with a central through opening 58, which may be round. At the bottom of the opening 58 is a widthwise-extending slot 60 with a forward face 61 parallel to a rear face 62. The base body member 40 is also provided with a central round opening 63, preferably cylindrical in form and in alignment with the opening 58. In the opening 63 a cylindrical member 64 is secured, as by a set screw 65. The upper end of the cylindrical member 64 has a projecting portion 66 with a flat vertical surface against which a third spring bearing 67 is connected, as by screws 68 and clamp member 69. A calibrated level 70 is supported at the upper end of the spring bearing 67 by means of a housing member 71, a clamp member 72, and screw means 73. An adjusting screw 74 is threaded through the upper assembly 50 and a needle 75 is adapted to bear against the clamp 72. A knurled handle 76 is used for adjusting the needle 75 and thereby to tilt the level 70.

A cam 80 is rotatably mounted around the cylindrical support member 64. The cam 80 preferably comprises an eccentrically bored disc (see Fig. 6) stepped to provide a knurled handle wheel 81. By turning the knurled wheel 81, the thicker edge of the eccentric disc 80 may be brought to bear against either the forward face 61 or rear face 62 of the slot 60, and the upper assembly 50 may thereby be moved forward and back, which, of course, at the same time moves the anvil 55 forward and back relative to the anvil 30 of the tailstock 14.

The device is used in the following manner: with the headstock 15 set in a normal position and with all the springs 43, 44, and 67 untensed, a precision gauge block is placed against the headstock anvil 55; then the tailstock anvil 30 is moved up into snug engagement with the opposite side of the gauge block. This may be done either by moving the knurled wheel 24 to loosen the lock screw 23 on the guide member 22 and moving the whole tailstock housing 20 forward or back, or for finer adjustments, it may be done by loosening the set screw 28 and moving the spindle 31 back and forth in the housing 20. Once the setting is made, the adjusting screw 74 for the level 70 is turned until the level 70 is perfectly centered, with the bubble 77 in the center, as shown in Figs. 1, 2, and 5.

Once this setting has been made, the knurled wheel 81 may be turned to bring the thicker edge of the cam 80 into contact with the rear end 62 of the slot 60 as shown in Fig. 5, thereby moving the anvil 55 back away from the tailstock anvil 30 so that the gauge block may then be removed. A machine part to be checked against the gauge block is then inserted into the space between the two anvils 30 and 55, and the knurled member 81 is turned until the anvils firmly engage the part being tested. This can easily be felt. At this time, if the part is exactly the same size, the bubble 77 of the level 70 will again be in its central position shown in Figs. 1, 2, and 5. If, however, there is any variation, the bubble 77 will lie outside the center, either forward or backward, depending on whether the part is narrower or thicker than the gauge block. The amount of difference can be read on the calibrations of the level 70, which may be marked to read in units of .0001 inch or even smaller. If desired, the position of the bubble can be read in between these markings to a quarter of this amount, or a vernier scale (not shown) may be supplied.

The sensitive level 70 mounted on the flat spring bearing 67, in conjunction with the adjusting screw 74, provides a highly sensitive comparator and measuring instrument. A length difference of .0001 between the anvils 30 and 55 may be made to result in a reading of nearly 2 inches, thereby making it possible to measure differences of a millionth of an inch.

Thus the device is extremely rapid and accurate in obtaining measurements. All that need be done each time is to rotate the knurled wheel 81 to retract the anvil 55, place the next part in, close the anvil 55, and make the reading on the level 70. Each time the device is used to check a different thickness, there will be a different setting and adjustment, made by the adjusting screw 74 and possibly by moving the tailstock body 20 or spindle 31, but that takes only a moment to operate and is very simple.

A modified form of comparator 100, also embodying this invention, is shown in Figs. 7 through 9. Many parts are identical and have been given the same reference numbers, including all the parts of the tailstock 14.

The headstock 115 is also different in some particulars, but it will be noted that again there is the base member 35, and the upper body assembly 150 is mounted on the pair of parallel leaf springs 43, 44. Also, the knurled wheel 81 again rotates the eccentric cam 80 so that it can be brought to bear against either the forward or rear face 61, 62 of the slot 60.

In this instance, however, the level 70 is replaced by a standard dial indicator gauge 170, calibrated so as to read in ten-thousandths of an inch. The connection to the gauge 170 is provided by a novel lever system. For this purpose, a bracket 171 is secured to the base 35 at the rear of the headstock 115. The bracket 171 is made strong enough to support the standard dial indicator gauge 170 at its upper end, and is also provided with a vertical slot 172 and a horizontal hole 173. A lever 174 is preferably mounted vertically in the slot 172 on a fulcrum 175 to give a 1 to 10 ratio, so that a standard one-thousandths inch dial indicator gauge can be used to read at ten-thousandths of an inch. A bearing member 176 projects out from the upper body member 150 through the hole 173 and bears against the lower end of the lever 174. The upper end of the lever 174 bears against the plunger 177 of the dial indicator 170.

Usually the dial indicator 170 is of the type in which a bezel 178 can be rotated to set the pointer (or dial) to zero. Operation is substantially the same as before, except that the zero setting is obtained by rotating the bezel 178 of the standard dial indicator gauge instead of by turning the adjusting screw 76 to correct the position of the level 70.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A micrometer-comparator for reading variances from a desired dimension, comprising; a main base; a tailstock supported on said base and having a reciprocatable spindle extending longitudinally therethrough, said spindle having an anvil on one end thereof; and a headstock having a base member mounted on said main base; a pair of flat spring bearings mounted parallel to each other, widthwise of said base member and extending upwardly therefrom; a body member supported on an upper portion of said pair of spring bearings generally parallel to and above said base member, said body member having an anvil at one end facing said tailstock anvil, retracting means mounted on said base for moving said body member relatively to said base member on said spring bearings; and gauge means for indicating the displacement of said headstock anvil from a given position relative to said tailstock anvil, whereby a set gauge may be placed between said anvils with said headstock anvil in the position to which it is normally urged by said spring bearings and subsequent parts can be compared with said set gauge by leaving said tailstock anvil stationary and noting the displacement necessary to position said headstock gauge thereagainst.

2. The micrometer-comparator of claim 1 wherein said tailstock has a calibrated barrel and thimble.

3. The micrometer-comparator of claim 1 wherein said gauge means includes a calibrated level supported above said body member on a single central, additional spring bearing.

4. The micrometer-comparator of claim 3 wherein said calibrated level is provided with an adjustment screw for varying the pressure of the spring bearing thereon.

5. The micrometer-comparator of claim 1 wherein said gauge means comprises a calibrated dial indicator gauge connected to said body member by a lever arrangement.

6. In a micrometer-comparator for reading variances from a desired dimension, the combination comprising: a base member; a pair of flat spring bearings mounted to said base member and projecting above it parallel to each other; a headstock supported by said pair of spring bearings generally parallel to and above said base member, said headstock having an anvil at one end and a recessed widthwise slot on its lower surface; a cam mounted rotatably on said base member and having an eccentric portion extending into said slot for engagement with said headstock, for moving said headstock relatively to said base member on said spring bearings when said cam is rotated; and gauge means for indicating the displacement of said anvil from a given position.

References Cited in the file of this patent

UNITED STATES PATENTS

| | | |
|---|---|---|
| 1,900,231 | Ede | Mar. 7, 1933 |
| 2,177,399 | Aller | Oct. 24, 1939 |
| 2,197,198 | Street | Apr. 16, 1940 |

FOREIGN PATENTS

| | | |
|---|---|---|
| 564,386 | Great Britain | Sept. 26, 1944 |